United States Patent
Zhao

(10) Patent No.: US 9,260,344 B1
(45) Date of Patent: Feb. 16, 2016

(54) MOLDABLE ENGINEERED STONE

(71) Applicant: Safas corporation, Clifton, NJ (US)

(72) Inventor: Yifang Zhao, Randolph, NJ (US)

(73) Assignee: SAFAS CORPORATION, Clifton, NJ (US)

(*) Notice: Subject to any disclaimer, the term of this patent is extended or adjusted under 35 U.S.C. 154(b) by 0 days.

(21) Appl. No.: 14/121,421

(22) Filed: Sep. 4, 2014

(51) Int. Cl.
*C04B 26/06* (2006.01)
*B29C 47/00* (2006.01)
*B29C 39/02* (2006.01)
*B29K 35/00* (2006.01)
*B29K 69/00* (2006.01)
*B29L 7/00* (2006.01)

(52) U.S. Cl.
CPC ............... *C04B 26/06* (2013.01); *B29C 39/026* (2013.01); *B29C 47/0019* (2013.01); *B29K 2035/00* (2013.01); *B29K 2069/00* (2013.01); *B29L 2007/002* (2013.01)

(58) Field of Classification Search
CPC .......... C08L 63/00; C09D 5/29; B32B 27/38; C04B 26/06; B29C 47/0019; B29C 39/026; B29K 2035/00; B29K 2069/00; B29L 2007/002
USPC .......... 524/556, 492; 525/107, 438, 523, 529; 523/171
See application file for complete search history.

(56) References Cited

U.S. PATENT DOCUMENTS

| 4,698,010 | A | 10/1987 | Toncelli | |
|---|---|---|---|---|
| 5,079,279 | A | 1/1992 | Hayashi et al. | |
| 6,387,985 | B1 * | 5/2002 | Wilkinson | C08K 3/22 523/171 |
| 7,227,436 | B2 | 6/2007 | Wieger et al. | |
| 7,442,726 | B2 * | 10/2008 | Ghahary | C09D 5/28 523/171 |
| 7,727,435 | B2 | 6/2010 | Ghahary et al. | |
| 2006/0293449 | A1 * | 12/2006 | Weberg et al. | 525/107 |

* cited by examiner

*Primary Examiner* — Michael M Bernshteyn
(74) *Attorney, Agent, or Firm* — Keith D. Nowak; Carter Ledyard & Milburn LLP

(57) ABSTRACT

This invention provides a moldable engineered stone composition comprising an ethylenically unsaturated acrylic polymer capable of being covalently crosslinked, a mineral particulate, and an ionic crosslinking agent which forms ionic bonds within the syrup of unsaturated acrylic polymer via unreacted acid groups, causing thickening prior to curing and prior to the formation of covalent bonds via the double bonds of the polymer chain. The composition is then capable of being extruded and molded in a press. Articles formed by curing the composition and methods for producing the composition are also disclosed.

13 Claims, No Drawings

MOLDABLE ENGINEERED STONE

FIELD OF THE INVENTION

This invention relates to moldable engineered stone and methods for making such engineered stone.

BACKGROUND OF THE INVENTION

Synthetic stone products are well known and are in great demand due to their ability to be manufactured in a wide variety of shapes, patterns and colors that cannot be consistently found in nature. Such compositions are for example described in U.S. Pat. Nos. 4,664,954, 4,085,246, 4,678,819, 4,734,452, 5,043,377 and 5,055,327. Synthetic stone compositions generally contain from 50 to 80% by weight of mineral particulate in a crosslinked resin matrix. The disadvantage of the described stone compositions is that when molded they result in surfaces which reflect the properties of the resin more than the properties of the mineral particulate contained in the compositions.

Engineered stone compositions on the other hand resemble natural stone to a greater degree but have much better fabricability compared to natural stone and are useful in slab or sheet form in both interior and exterior walls of buildings, indoor and outdoor floors, fireplaces, table and counter tops, tiles and an assortment of other uses for natural stone. Engineered stone compositions contain a higher percentage of a mineral particulates, generally in the range of 80 to 95% by weight, in a resin matrix as compared to moldable synthetic stone compositions and provide a stone-like surface. Such compositions are described in U.S. Pat. Nos. 6,387,985 and 7,727,435. The disadvantage of known engineered stone compositions is the limited means of producing the composite and the shape of the products obtained. Engineered stone is formed by casting methods and requires both vibration and a vacuum in order to obtain a properly compacted, bonded structure of the mineral particulate and to eliminate any entrapped air. Casting can be a serious problem in commercial manufacture of the slabs since it is a batch process subject to property variations from batch to batch. Casting methods furthermore require extensive set up and cleanup operation in order to resume production after completion of a run.

SUMMARY OF THE INVENTION

This invention provides engineered stone compositions that can be extruded and molded avoiding the problems associated with casting and is based on the discovery that carboxylic acid groups of the polymer in a matrix resin interact with certain metal oxides and hydroxides to form ionic links that greatly increase the viscosity of the matrix resin to the point of solidifying the composite of the matrix resin and a mineral particulate prior to curing the composite.

More specifically this invention provides methods for engineered stone products that can be molded in varying shapes.

The engineered stone products of the present intervention are obtained from a composition comprising a mineral particulate in a matrix of an unsaturated acrylic polymer capable of being crosslinked with additional monomer through a free radical initiator forming covalent bonds containing unreacted carboxylic acid groups, a free radical initiator, and an ionic crosslinking agent. The engineered stone products are obtained from this composition by free radical initiated crosslinking of the acrylic polymer.

The present invention provides a method of forming engineered stone articles, which comprises continuously extruding a crosslinkable acrylic resin containing at least 80% by weight of the total composition of a mineral particulate in the form of a sheet and thereafter forming and curing the sheet in a mold by means of covalent crosslinking and recovering a finished article from the mold with a smooth stone-like surface.

DETAILED DESCRIPTION OF THE INVENTION

The present invention is directed to an engineered stone composition that can be cured in a mold and to a method of manufacturing of engineered stone products comprising extruding the moldable composite comprising a mixture of a matrix resin and a particulate in the form of a sheet with sufficient coherence and solidity to be molded in to shapes in a conventional molding press.

The goals of the present invention are achieved by employing as the matrix resin an acrylic polymer having incorporated in the polymer chain unreacted acrylic acid groups in addition to unsaturated bonds capable of being covalently crosslinked through the reaction of additional monomer and a free radical initiator with (2) an ionic crosslinking agent capable of ionic crosslinking through the carboxylic acid groups of the acrylic polymer and (3) having admixed therewith a mineral particulate in at least 80% concentration. The ionic crosslinking agent is essential to allow the formation of a solid but flexible sheet that can be cured in a mold. In the absence of such the resulting cured sheet contains defects including incomplete bonding of the particulate to the matrix resin and visible voids in the matrix. Ionic crosslinking agents suitable for use in the present invention are generally divalent metal oxides or hydroxides which are capable of reacting with organic acids. Preferred ionic crosslinking agents are calcium and magnesium hydroxides. The present invention is based on the discovery that the carboxylic acid groups of the matrix resin react with the metal oxide or hydroxide to form ionic linkages that rapidly increase the viscosity and solidify the composite of the matrix resin and mineral particulate sufficiently to form a solid coherent sheet that can be handled for placement in a mold before covalent crosslinking is initiated to form the rigid, crosslinked engineered stone structure in the mold. The concentration of the free carboxylic acid groups and the metal oxide or hydroxide can be varied to adjust the rigidity of the extruded sheet and the rapidity in which the extruded sheet is solidified. Thus increasing the concentration of either or both the carboxylic acid group in the acrylic polymer and the concentration of the ionic crosslinking agent results in a more rigid sheet that is formed faster on extrusion of the mixture.

The acrylic polymers employed in the present invention primarily are based on monounsaturated esters of acrylic or methacrylic acid. The esters are derived from an alcohol having up to six carbon atoms although the preferred esters are methyl and ethyl acrylate or methacrylate and butyl acrylate. In addition the acrylic polymers employed in the present invention contain from 1 to 10% by weight of the polymer of acrylic or methacrylic acid copolymerized with the esters. In further addition the polymers of the present invention have copolymerized di- or polyethylenically unsaturated acrylic or methacrylic esters in sufficient concentration to achieve the desired covalent crosslinking of the matrix resin. Such covalent acrylic crosslinking monomers include ethylene glycol di(meth)acrylate, polyethylene glycol di(meth)acrylate, propylene glycol di(meth)acrylate, 1,3-butylene glycol di(meth)acrylate, 1,4-butylene glycol di(meth)acrylate, polybutylene glycol di(meth)acrylate, 1,6-hexanediol di(meth)acrylate, dimethylolethane di(meth)acrylate, 1,1 dimethylpropane di(meth)acrylate, 2,2-dimethylolpropane di(meth)acrylate, trimethylolethane tri(meth)acrylate, trimethylolpropane tri(meth)acrylate, tetramethylolmethane tri(meth)acrylate, tetramethylolmethane di(meth)acrylate, and neopentyl glycol di(meth)acrylate. The acrylic polymer is generally employed in the form of a syrup of the polymer in a liquid crosslinking acrylic monomer. Any acrylic monomer that is liquid at room temperatures can be employed as the crosslinking monomer but usually is either the acrylate or methacrylate ester of methanol or ethanol. In accordance with the present invention the crosslinking monomer may also contain other polymeric ingredients such as epoxy resins.

The concentration of the polymer in the syrup can be varied from about 25% to 45% by weight of the syrup. The molecular weight of the acrylic polymer is generally in the range of about 20,000 to 100,000. The described acrylate polymer is employed in a concentration of about 15 to 20% by weight of the engineered stone composition.

The mineral particulates employed in the engineered stone composition of the present invention are those normally used in engineered stone composition and include marble, granite, quartz, sand, and colored glass. The mineral particulate is employed in sizes ranging from about 325 to 2 mesh (0.04 mm to 10.3 mm in greatest average dimension).

In a preferred form the mineral particulate comprises a mixture of varying particle sizes and in varying amounts of any given size. The engineered stone compositions of the present invention contain greater than 80% by weight and preferably from about 80 to 85% of the mineral particulate based on the weight of the total composition. The mineral particulate is generally used in combination with a bonding agent to promote the adhesion of the acrylic copolymer to the mineral particulate, Such bonding agents have been described in the art and are preferably silanes such as acryloylpropyltrimethoxysilane, commercially available as A174, and vinyltrimethoxysilane, commercially available as A171.

The ionic crosslinking agents that are admixed with the acrylic syrup and the mineral particulate are divalent metal oxides and hydroxides capable of reacting with the carboxylic acid groups of the acrylic resin in the syrup. The physical effect of the ionic crosslinking is a viscosity increase of the composite of acrylic syrup and particulate. Preferred metal oxides are calcium and magnesium oxides and hydroxides. The metal oxides and hydroxides are added to the syrup and mineral particulate mixture in finely divided powder form in a concentration sufficient to cause an increase in the viscosity of a sheet formed from the mixture so that it can be handled as a flexible, rubbery solid. Concentrations required to obtain the mixture of syrup and particulate in the desired solid form vary from 0.5 to 5% by-weight of the mixture. The ionic crosslinking occurs at room temperatures and requires about 25 to 30 minutes for a formed sheet to reach a solid state through increasing viscosities.

The moldable engineered stone compositions also include a free radical polymerization initiator to initiate the crosslinking of the formed and preferably extruded composite during the molding step. Suitable initiators for the acrylic syrups are known in the art and include benazyl peroxide, di-(4-tert-butyl-cyclohexyl) peroxydicarbonate, 2,5-dimethyl-2,5-di-(2-ethylhexyanoylperoxy) hexane, tert-amyl peroxy-2-ethylhexanoate, butyl peroxy-2-ethylhexanoate, 1,1-di-(tert-butylperoxy)-3,5,5-trimethylcyclohexane, and 1,1-di-(tert-butylperoxy) cyclohexane. The initiator concentration can be varied although it is generally in the range of 0.01 to 2.5% by weight of the matrix resin.

Other additives include pigments to provide desired color variations such as titanium dioxide, carbon black, iron oxides, and copper oxides. It is generally also desirable to add an antioxidant or UV stabilizer if the final product is exposed to strong sunlight. Similarly mold release agents may be added to the composite mixture for easier removal of delicate shapes.

The molding process to obtain the engineered stone products of the present invention involves two steps, where in the first step a moldable sheet is formed, and in the second step, where the moldable sheet is covalently crosslinked at elevated temperatures in a mold to form the final cured product. Although the moldable sheet can be formed from the composite through standard mixing and casting processes, it is preferably formed using a mixing extruder, the advantage being that the ionically crosslinked sheet can be formed on a continuous basis. The extrusion should be conducted at temperatures below which covalent crosslinking is initiated and generally is done at ambient temperatures. All of the ingredients are added to the mixing extruder and thoroughly blended by the screw in the extruder. The extrudate from the extruder is formed into a sheet with a thickness of preferably 0.2 to 2 inches and exposed to ambient conditions on a flat surface such as a moving belt for sufficient time for the ionic crosslinking to take place and form a solid flexible sheet. Solidification of the sheet varies with the concentration of carboxylic acid groups and metal oxide or hydroxide present in the mixture, but generally varies from 15 to 45 minutes. Further exposure may increase the rigidity of the sheet if desired. On completion of the ionic crosslinking, the resulting rubbery sheet can be lifted off the flat surface and cut to the desired dimensions to be placed in a mold and compression molded to the final shape and allowed to cure through covalent crosslinking at elevated temperatures. Curing temperatures generally vary from 150 to 300° F. depending on the initiator used and the length of the molding cycle.

The invention is further illustrated by the following examples wherein the parts listed are by weight.

EXAMPLE

Acrylic Syrup Preparation

Into a reaction vessel with a stirrer, a thermometer, a nitrogen introduction tube and a cooler were added 160 parts of methyl methacrylate, 35 parts butyl methacrylate, 5 parts of methacrylic acid, 3 parts of ethylene glycol dimethacrylate and 1 part of parafin wax. The mixture was heated under nitrogen to 180-200° F. and 0.03 parts of azobisisobutyronitrile as a polymerization initiator and 0.5 parts of n-dodecyl mercaptan as a chain transfer agent were added with continuous agitation. Bulk polymerization was continued for about 30 minutes after which the reaction mixture was rapidly cooled. The viscosity of the resulting acrylic resin syrup was 7 poises at room temperature and had 25% polymer content.

Molded Sheet Preparation.

In preparing the syrup for blending with the mineral particulate as the matrix resin, the foregoing syrup is further modified by adding 1% based on the weight of the syrup of zinc stereate as a mold release agent, 1% based on the weight of the syrup of Dow Corning silane A-174, 1% by weight of the syrup of Akzo Nobel Trigonox 141 crosslinking catalyst, to a mixing extruder with a 4' mixing screw and separate ports for the matrix resin, the particulate, and the ionic crosslinking agent. These components are added through such ports: 80 parts of a particulate, 20 parts of the described matrix resin, and 0.5 parts of magnesium oxide as the ionic crosslinking agent. The particulate of comminuted quartz comprised 40% by weight of the total particulate passing a 325 mesh screen, 20% of the particulate passing a 72 but not a 100 mesh screen, 20% passing a 20 but not a 70 mesh screen, and 20% passing a 6 but not a 10 mesh screen. The extrusion was carried out at room temperature. At the extrusion nozzle the extrudate was spread into the confined section of a 50' long extrusion belt providing a flat surface approximately 50" wide and then passed through a set of three rollers that spread the extrudate to a uniform sheet 6 mm thick. The extruded sheet rapidly increased in viscosity and solidified as a result of the ionic crosslinking as it moved the length of the belt over a period of 30 minutes. At the end of that time the sheets was a rubbery solid that could easily be lifted from the belt. The sheet as formed can be directly placed in the mold for the final step of molding the sheet into a covalently crosslinked, cured solid but is preferably allowed to further form ionic bonds for a period up to 12 hours. The sheet is then placed in a mold and compression molded at a temperature of 230° F. and a pressure of 25 kg/cm². The resulting molded piece has a smooth stone like appearance.

What is claimed is:

1. A moldable engineered stone composition, comprising:
   (a) 15 to 20% by weight of the composition of a matrix resin comprising a syrup of an unsaturated acrylic polymer containing from 1 to 10% by weight of the polymer of an acrylic carboxylic acid copolymerized with monounsaturated esters and having unreacted acid groups, and from 1 to 5% by weight of the polymer of a crosslinking acrylic monomer,
   (b) from 80 to 85% by weight of the composition of a mineral particulate,
   (c) from 0.20 to 5% by weight of the composition of an ionic crosslinking agent, said ionic crosslinking agent forming ionic bonds with said unreacted acid groups, said ionic bonds causing a thickening prior to covalent crosslinking, and
   (d) a free radical polymerization initiator.

2. The moldable composition of claim 1 wherein the ionic crosslinking agent is a divalent metal oxide or hydroxide.

3. The composition of claim 2 wherein the metal oxide is magnesium or calcium oxide.

4. The composition of claim 2 wherein the metal hydroxide is magnesium or calcium hydroxide.

5. The composition of claim 1 wherein the acrylic polymer is a methyl methacrylate polymer and the monomer comprises methyl methacrylate.

6. The composition of claim 1 wherein the mineral particulate is comminuted quartz, granite, glass, sand, or combinations thereof.

7. The composition of claim 5 wherein the methacrylate polymer comprises 25 to 30% of the syrup and is dissolved in the methyl methacrylate monomer.

8. A cured article formed by curing the composition of claim 1.

9. The article of claim 8 formed from an extruded sheet.

10. A method of preparing a molded engineered stone composition which comprises:
    (i) forming a composition of:
       (a) from 15 to 20% by weight of the composition of an unsaturated acrylic polymer in the form of a syrup, containing from 1 to 10% by weight of the acrylic polymer of an acrylic carboxylic acid copolymerized with monounsaturated esters and having unreacted acid groups, and from 1 to 5% by weight of the acrylic polymer of a crosslinking acrylic monomer,
       (b) from 80 to 85% by weight of the composition of a mineral particulate,
       (c) from 0.25 to 0.5% by weight of the composition of an ionic crosslinking agent, and
       (d) a free radical polymerization initiator,
    (ii) forming such composition into a sheet,
    (iii) allowing the viscosity of the sheet to increase until the sheet has been solidified, said viscosity increasing via a formation of ionic bonds between said ionic crosslinking agent and said unreacted acid groups, and
    (iv) molding the sheet into a formed article at elevated temperatures to cause curing of the molded article.

11. The method of claim 10 wherein the composition is extruded on to a flat surface to form the sheet.

12. The method of claim 10 wherein the acrylic polymer is a methyl methacrylate polymer and the monomer is methyl methacrylate.

13. The method of claim 10 wherein the formed sheet is cured at elevated temperatures in a closed mold.

* * * * *